United States Patent
Furukawa et al.

(10) Patent No.: US 6,624,923 B2
(45) Date of Patent: Sep. 23, 2003

(54) OPTICALLY FUNCTIONAL DEVICE, SINGLE CRYSTAL SUBSTRATE FOR THE DEVICE AND METHOD FOR ITS USE

(75) Inventors: Yasunori Furukawa, Ibaraki (JP); Kenji Kitamura, Ibaraki (JP); Shunji Takekawa, Ibaraki (JP); Masaru Nakamura, Ibaraki (JP)

(73) Assignee: National Institute for Research in Inorganic Materials, Tsukuba (JP)

( * ) Notice: Subject to any disclaimer, the term of this patent is extended or adjusted under 35 U.S.C. 154(b) by 265 days.

(21) Appl. No.: 09/796,594

(22) Filed: Mar. 2, 2001

(65) Prior Publication Data

US 2002/0033993 A1 Mar. 21, 2002

(30) Foreign Application Priority Data

Sep. 18, 2000 (JP) ........................ 2000-281878

(51) Int. Cl.$^7$ ............................................. G02F 1/355
(52) U.S. Cl. ......................................................... 359/326
(58) Field of Search ............................... 359/326–332

(56) References Cited

U.S. PATENT DOCUMENTS 5,315,432 A * 5/1994 Ohno .......................... 359/326
5,371,812 A * 12/1994 Nakamura ....................... 385/9
6,211,999 B1 * 4/2001 Gopalan et al. ............. 359/326

OTHER PUBLICATIONS

Y. Furukawa et al, "Stoichiometric LiTaO3 as New Nonlinear Material for Bulk Quasi–Phasematching", 1999 Conference on Lasers and Electro–Optics (CLEO'99), Paper CTuM5, May 25, 1999, pp. 167–168.*

* cited by examiner

Primary Examiner—John D. Lee
(74) Attorney, Agent, or Firm—Oblon, Spivak, McClelland, Maier & Neustadt, P.C.

(57) ABSTRACT

An optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a $LiTaO_3$ crystal having a molar ratio of Li/Ta within a range of from 0.95 to 1.02, is used as the substrate, so that the propagation loss of light passed through the polarization-inverted portions immediately after formation of the polarization-inverted structures, is not more than 2%.

7 Claims, 5 Drawing Sheets

OPTICALLY FUNCTIONAL DEVICE, SINGLE CRYSTAL SUBSTRATE FOR THE DEVICE AND METHOD FOR ITS USE

BACKGROUND OF THE INVENTION

1. Field of the Invention

The present invention relates to an optically functional device to control light by utilizing polarization-inverted structures in a $LiTaO_3$ single crystal substrate, which is useful in various fields of e.g. optical information processing, optical processing technology, optical communication technology and optical measurement using a laser beam, a single crystal substrate for such an optically functional device, and a method of using such a single crystal substrate for the optically functional device.

2. Discussion of Background

A lithium tantalate ($LiTaO_3$) single crystal (hereinafter sometimes referred to simply as "LT") known as a typical ferroelectric single crystal, is used mainly as a substrate for a surface acoustic wave device. With respect to this crystal, a single crystal having a large diameter and a high compositional homogeneity can be supplied at a relatively low cost. Further, this crystal is transparent within a wide wavelength range of from ultraviolet to infrared, and it is possible to invert the ferroelectric polarization even at room temperature by applying a high electric field at a level of a few tens kV/mm. Accordingly, it has attracted attention in recent years also as a substrate for various optically functional devices such as non-linear optical devices or electro-optical devices, using the polarization-inverted structures.

Particularly, in recent years, it is expected to have second harmonic wave generating (SHG) devices of waveguide type developed to convert a semiconductor laser having a near infrared wavelength to a blue light having a half wavelength by a non-linear effect. Among them, a frequency conversion device is most thoroughly studied which employs an element of a structure having the polarization of an inorganic ferroelectric single crystal such as LT or a lithium niobate ($LiNbO_3$) single crystal (hereinafter sometimes referred to simply as "LN") periodically inverted, as a light source for high density recording/read out of optical disks. Such a frequency conversion device is based on a quasi phase matching (QPM) system, which is a system to carry out phase matching by compensating the difference between propagation constants of the fundamental wave and the higher harmonic wave with the periodic structures.

This system has many excellent characteristics such that high conversion efficiency can be obtained, collimation or diffraction limit condensation of the output light is easy, and useful materials or wavelengths are not particularly limited. As the periodic structures for QPM, structures having the sign of the SHG coefficient (the $d_{33}$ coefficient) periodically inverted, are most effective to obtain high efficiency, and with a ferroelectric crystal, positive or negative of the d coefficient corresponds to the polarity of the ferroelectric polarization, whereby the technology to have the ferroelectric polarization domains periodically inverted, becomes important.

As a device employing this system, a green SHG device by means of an internal resonator using a $Nd:YVO_4$ single crystal as the fundamental wave, has been reported, which employs a QPM element having periodically inverted structures formed by applying an electric field of about 21 kV/mm to a LT single crystal, as disclosed in a literature (Y. Kitaoka et al., Optics Letters, 21, p1974, 1996). Particularly, the LT single crystal has a large non-linear optical constant ($d_{33}$ being 26 pm/V) comparable to the LN single crystal and is strong against optical damage as compared with the LN single crystal, and its fundamental absorption range extends to 280 nm, whereby it is expected to be useful as a frequency conversion material for short wavelengths.

Further, with respect to an optical device utilizing an electro-optical effect, for example, according to a literature (M. Yamada et al., Appl. Phys. Lett., 69, p3659, 1996), attention has been drawn to a cylindrical lens, a beam scanner, a switch, and an optical device to form polarization-inverted structures of a lens or prism shape in a LN single crystal as a ferroelectric crystal by applying a high electric field to the crystal and to polarize a laser beam passed therethrough by utilizing the electro-optical effect, as new optical devices. The LT single crystal which is transparent to a shorter wavelength than the LN single crystal, is considered to be promising as an excellent substrate material for an optical device using ultraviolet to visible light.

With respect to a frequency conversion device or an electro-optical device utilizing the polarization-inverted structures of a ferroelectric LT single crystal, so far reported, in each case, a commercially available LT single crystal having a congruent composition with no additive, has been employed as the substrate crystal, because the LT single crystal so far available has been limited to a crystal having a congruent composition grown by a Czochralski method which is capable of growing a crystal having a large diameter inexpensively, from the industrial viewpoint. With respect to the LT crystal, it is well known from the correlation diagram of temperature/compositional ratios (phase diagram) that the stoichiometric composition and the congruent composition do not agree with each other.

Only the congruent composition is a composition whereby the composition of the melt and the composition of the crystal will agree, and a crystal having a uniform composition can be grown over the entire crystal. Accordingly, the composition of the LT single crystal which is presently produced and used for various applications, is a congruent composition having a molar fraction of $Li_2O/(Ta_2O_5+Li_2O)$ of about 0.483 (the molar ratio of Li/Ta being about 0.93). Accordingly, in the conventional LT single crystal having a congruent composition, the Ta component is excessive, whereby Ta ions as much as a few percent are substituted for Li ions (anti-site defects), and Li ion sites also have a few percent of vacancy defects. The influence of these defects may not be serious for an application to a surface acoustic wave device, but can not be neglected for an application to an optical device. Accordingly, it has been desired to develop a crystal having a composition close to the stoichiometric composition and having non-stoichiometric defects reduced, as a substrate to be used for optically functional devices.

As is apparent from the phase diagram, for example, in the case of a LT single crystal, a crystal having a composition close to the stoichiometric composition can be precipitated from a melt having a composition having a Li concentration higher than the stoichiometric composition. However, when it is attempted to grow a crystal having the stoichiometric composition by the Czochralski method which has been used as a means to produce a LT crystal having a large diameter in a large amount on an industrial scale, the excessive Li component will remain in a crucible along with the precipitation of the crystal, and the compositional ratio of Li/Ta in the melt will gradually change, whereby the compositional ratio in the melt will reach the eutectic point soon after the initiation of growing. Accordingly, the solidification ratio of the crystal is restricted to a level as low as about 10%, and the quality of the precipitated crystal has been so poor that it can not be used for an optically functional device.

The present inventors have previously invented a lithium tantalate single crystal close to the stoichiometric composition having a molar fraction of $Li_2O/(Ta_2O_5+Li_2O)$ of from 0.495 to 0.50 (the molar ratio of Li/Ta being from about 0.98 to 1.00) and having the non-stoichiometric defect concentration of the congruent composition substantially reduced, as a novel substance different from the conventional commercially available LT crystal having a congruent composition, and have filed a Patent Application (JP-A-11-35393). Further, they have reported about this novel crystal in a literature as follows. Namely, as a means to develop a crystal of high quality by reducing such non-stoichiometric defects, the present inventors have proposed a method of growing a crystal while continuously supplying the material (hereinafter referred to simply as the continuous supply method), for example, in a literature (Y. Furukawa et al. J. Crystal Growth 197, p889, 1999).

Specifically, it is a method wherein the molar fraction of $Li_2O/(Ta_2O_5+Li_2O)$ in the melt for growing is adjusted to be from 58.0 to 59.0 (the molar ratio of Li/Ta being from about 1.38 to 1.44) i.e. the Li component being excessive, and the crucible is made to have a double structure so that from the inner crucible, a LT crystal close to the stoichiometric composition is pulled up and the weight of the crystal being pulled up is measured at all times to obtain the growth rate, and a starting material powder having the same stoichiometric composition as the crystal, is continuously supplied between the outer and inner crucibles at that rate. By employing this method, it becomes possible to grow a long crystal, and a crystal solidification ratio of 100% based on the amount of the material supplied, has been realized. It is reported that the crystal grown by this method has a Curie temperature of from 675 to 685° C., which is far higher than the Curie temperature of 601° C. of the conventional crystal having a congruent composition, and a lithium tantalate single crystal close to the stoichiometric composition with excessive Ta, has been obtained.

Further, recently, the present inventors have reported that with the above-mentioned crystal close to the stoichiometric composition with excessive Ta, the applied voltage required for the polarization inversion is at a level of 1/10 of the voltage heretofore applied (K. Kitamura et al., Appl. Phys. Lett., 73, p3073, 1998). Namely, they have reported that the presence of a few percent of non-stoichiometric defects (anti-site defects or vacancy defects) in the conventional crystal having a congruent composition, possibly increases the applied voltage required to form the periodic polarization structures or the optical characteristics which the LT crystal essentially has.

Further, it is known that with LT single crystals having a congruent composition, the optical damage resistance varies as much as a few digits among the crystals. However, as compared with the conventional congruent composition, the lithium tantalate single crystal close to the stoichiometric composition with excessive Ta, has an improved optical damage resistance against irradiation with a green optical laser having a wavelength of 532 nm, and the fluctuation among the crystals tends to be small to some extent, as reported (Yasunori Furukawa et al., Collection of papers delivered at the 60th Applied Physics Society Lecture Meeting 2b-ZB-1, the third volume, paragraph 1001, 1999).

Further, it is known that a LT single crystal close to the stoichiometric composition having MgO added, shows a optical damage resistance superior to the conventional congruent composition against irradiation with a green color optical laser having a wavelength of 532 nm (Akio Miyamoto et al., Collection of papers delivered at the 4th Artificial Crystal Discussion Meeting 27A, paragraph 75, 1999). It is also known that with any composition, the optical damage of a LT single crystal with excessive Ta is more likely to result as the wavelength of the irradiated laser becomes shorter, and the optical damage resistance in the vicinity of a wavelength of 400 nm is lower by at least two digits than the optical damage resistance at a wavelength of 532 nm. In such a case, Mg is substituted also at Li sites, and as the amount of Mg added, increases, the Li/Ta molar ratio becomes small as compared with the crystal having no additive, and the Li/Ta molar ratio of the obtained crystal is from 0.95 to 1.0.

A research on a near infrared region bulk OPO device as a quasi-phase-matching (QPM) device employing a LT single crystal (Curie temperature: 680–685° C.) close to the stoichiometric composition of a lithium tantalate single crystal with excessive Ta, has been reported, for example, in a literature (Takaaki Hatanaka et al., Preparatory papers for the 60th Applied Physics Society Lecture Meeting 2a-k-7, third volume, p.932, 1999). Namely, a periodic electrode is provided on one side of a LT single crystal close to the stoichiometric composition of z-cut, and a uniform electrode is provided on the other side, and a pulse voltage of about a few kV/mm is applied through these electrodes, whereby a near infrared region bulk OPO device having a thickness of from 1 to 2 mm is prepared relatively easily. However, it is difficult to carry out the polarization inversion uniformly, and preparation of such a device is limited to formation of polarization-inverted structures in a very small area, and it has not been possible to form polarization inversion over a large area.

Further, according to a literature (Koichiro Nakamura et al., Preparatory papers for the 47th Applied Physics Society Lecture Meeting 30p-ZD-3, third volume, p.1105, 2000), preparation of an OPO device having a crystal substrate thickness of 3 mm has been studied by using as a substrate, a LT single crystal close to the stoichiometric composition with excessive Ta which has been previously invented by the present inventors, but control of polarization inversion has been more difficult, whereby a bulk OPO device employing it as the substrate, has not been obtained.

In order to form polarization-inverted structures on a substrate made of a ferroelectric single crystal and to realize an optically functional device utilizing the interaction between the electro-optical effect and the non-linear optical effect of light passed through the polarization-inverted portions, the most important technique is to prepare from a few to as many as several hundreds polarization-inverted structures of a few $\mu m$ to several tens $\mu m$ sizes uniformly and with high precision.

As a method for forming polarization inversion, an electron beam irradiation method or a voltage application method is well known and commonly used. Such an optically functional device is used by passing light through the polarization-inverted portions, and if there is an optical distortion or loss at the respective polarization-inverted boundaries, very substantial optical non-uniformity will result as the entire device, whereby a device with high efficiency can not be realized.

An optical distortion will be formed at the boundary of a polarization-inverted portion, whereby a change in the refractive index as large as $10^{-3}$ to $10^{-4}$ or larger will result.

A serious problem has been pointed out in a literature (V. Gopalan et al., J. Appl. Phys., vol. 80, p.6104, 1996) such that the change in the refractive index brings about scattering of the laser beam passed therethrough, whereby the operation of the device will depart from the ideal condition, and the device efficiency will decrease. It is reported that in order to remove the optical distortion caused by such a large change in the refractive index, it is necessary to heat the LT single crystal having the polarization-inverted structures formed, at a temperature of 350° C. for about 12 hours to relax the optical distortion.

Further, in the above-mentioned literature, (Y. Kitaoka et al., Optics Letters, 21, p1972, 1996), it is reported that heat treatment is necessary after formation of polarization inversion by application of an electric field, also for a green color optical frequency conversion device by means of an internal resonator using a Nd:$YVO_4$ single crystal as the fundamental wave, employing a QPM device having periodically inverted structures formed by applying an electric field of about 21 kV/mm to a LT single crystal as a ferroelectric crystal. It is reported that in this case, the propagation loss within the crystal can be reduced to a level of from 2.5% to 0.1%, by heating the crystal at a temperature of at least 100° C.

In a conventional voltage application method, it is common that a LT single crystal having a congruent composition of z-cut is employed, and a periodic electrode is provided on one side of the crystal, and a uniform electrode is provided on the other side, and the sample is maintained at room temperature or heated to a level of about 200° C., and a pulse voltage is applied through the electrodes to invert the polarization of the portion immediately beneath the periodic electrode towards the z-axis direction. In the case of a conventional LT single crystal having a congruent composition, an applied voltage as high as at least 21 kV/mm is required for the polarization inversion.

Such a polarization inversion technique in the LT and LN single crystals, is to forcibly change the polarization i.e. the positions of Ta and Nb or Li ions in the crystal, at a temperature of not higher than the Curie temperature. With respect to the LT and LN single crystals, it is suggested that the high voltage required for the polarization inversion may not necessarily be the direct cause for an optical distortion.

Namely, in the above-mentioned literature (A. Harada et al., Optics Letters, 22, p805, 1997), it is reported that with a LN single crystal having a congruent composition having 5 mol % of MgO added, the voltage required for the polarization inversion can be reduced to a level of about ⅕ of the voltage required for a usual congruent composition, but, even if this material is employed, heating at a temperature of 500° C. for three hours is required to remove an optical distortion in a case where a SHG laser having polarization-inverted structures formed in a periodic cycle of 4.75 μm in a LN single crystal having MgO added, by means of a corona discharge method, is to be prepared.

Figure 1A:
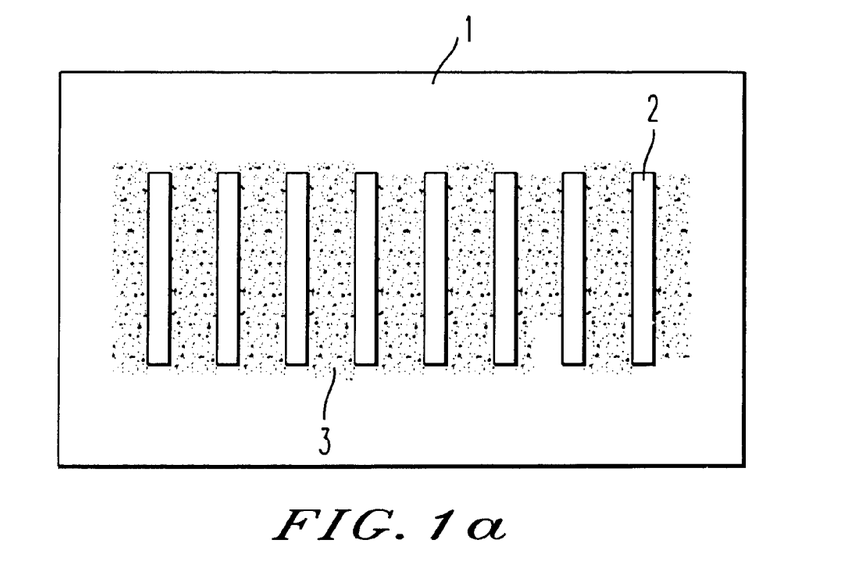
FIG. 1(a) is a view showing the +z surface of a conventional LT crystal substrate having a congruent composition after formation of periodic polarization inversion, as observed by a transmission polarization microscope.

When the polarization-inverted boundaries of such a device having polarization-inverted structures formed in a substrate made of a conventional LT crystal having a congruent composition, were observed by a polarization microscope, it was observed, as shown in FIG. 1(a), that the boundaries of the polarization-inverted portions were not smooth, and large optical distortions were observed at all of the polarization-inverted boundaries. Further, when the working laser beam was passed across the polarization-inverted portions, a very large propagation loss at a level of a few percent to a few tens percent was observed. Formation of such optical distortions at the polarization-inverted boundaries, not only creates a problem of a large propagation loss but also makes it necessary to provide an extra heat treatment step for the preparation of an optically functional device to relax the optical distortions.

Further, another serious problem is that a pyroelectric effect is likely to form at polarization-inverted portions of a few μm size once formed by e.g. an electric field application method at portions of a single polarization substrate during the heat treatment to remove distortions, whereby the crystal is likely to be broken, or the sizes or positions of the polarization-inverted portions are likely to change although very slightly. Such a change creates a serious problem for the preparation of a device with high efficiency and good reproducibility.

SUMMARY OF THE INVENTION

The present inventors have continuously studied the characteristics of the LT single crystals as ferroelectric single crystals in order to solve the above-mentioned problems of the prior art and have found that with a LT single crystal having a composition close to the stoichiometric composition, even when polarization inversion is formed, optical distortions or propagation losses of light at the polarization-inverted boundaries are very small, and by using this single crystal as the substrate, it is possible to prepare an optically functional device having polarization-inverted structures, which has excellent properties.

Namely, the present invention provides an optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a $LiTaO_3$ crystal having a molar ratio of Li/Ta within a range of from 0.95 to 1.02, is used as the substrate, so that the propagation loss of light passed through the polarization-inverted portions immediately after formation of the polarization-inverted structures, is not more than 2%.

Further, the present invention provides an optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a $LiTaO_3$ crystal having a molar ratio of Li/Ta within a range of from 0.95 to 1.02, is used as the substrate, so that the change in the refractive index of the polarization-inverted boundaries is not more than $1 \times 10^{-4}$ without a heating step to remove an optical distortion at the polarization-inverted boundaries due to the directional inversion of spontaneous polarization in the ferroelectric crystal.

Further, the ferroelectric single crystal substrate to be used in the above optically functional devices is made of a $LiTaO_3$ crystal having a molar ratio of Li/Ta within a range of from 0.95 to 1.00 and containing from 0.1 to 4.8 mol % of at least one element selected from the group consisting of Mg, Zn, Sc and In, as doped.

Still further, the present invention provides a single crystal substrate for an optically functional device to control light passed through a polarization-inverted portions, which is a ferroelectric single crystal substrate having polarization-inverted structures formed at a temperature of not higher than the Curie temperature by an electron beam scanning irradiation method or a voltage application method, wherein a $LiTaO_3$ crystal having a molar ratio of Li/Ta within a range of from 0.95 to 1.02, is used as the substrate, so that a propagation loss of light of not more than 2% and an optical distortion of not more than $1 \times 10^{-4}$ are obtainable without a heat treatment.

The present invention further provides a method for improving the frequency conversion efficiency of an optically functional device, wherein a $LiTaO_3$ crystal having a molar ratio of Li/Ta within a range of from 0.95 to 1.02, is used as a substrate for the optically functional device to carry out the frequency conversion of a laser entered into a single crystal having periodically inverted polarization structures by means of a nonlinear optical effect.

Furthermore, the present invention provides a method for improving the driving efficiency of an optically functional device, wherein a $LiTaO_3$ crystal having a molar ratio of Li/Ta within a range of from 0.95 to 1.02, is used as a substrate for the optically functional device to control polarization or condensing of a laser beam entered into a single crystal having polarization structures inverted in a prism or lens shape by means of an electro-optical effect.

DETAILED DESCRIPTION OF THE PREFERRED EMBODIMENTS

The present inventors have found that the problems in the device performance or in the polarization inversion control characteristic of an optically functional device utilizing polarization-inverted structures of a ferroelectric single crystal, are attributable to the single crystal substrate. The present invention is based on a discovery that a single crystal substrate of a LT crystal having a certain specific composition is useful for optically functional devices utilizing polarization-inverted structures of a ferroelectric single crystal. Namely, as is different from the characteristics of conventional materials, the lithium tantalate single crystal having a molar ratio of Li/Ta within a range of from 0.95 to 1.02, particularly from 0.98 to 1.02, is capable of substantially improving the quality of a polarization-inverted device material.

It has been found that by using such a lithium tantalate single crystal, the characteristics of the optically functional devices can be remarkably improved.

The polarization inversion characteristics found by the present invention are also ones attributable to the effect specific to the LT single crystal having such a molar fraction. The LT single crystal close to the stoichiometric composition is a crystal, from which it has become possible to prepare an optically homogeneous substrate only recently by a double crucible method wherein the material is continuously supplied, and its optical characteristics have not yet been fully clarified. Especially, the optical characteristics of the polarization-inverted boundaries of such a crystal have been made clear for the first time by the present inventors. Substantial improvement of the characteristics of an optically functional device utilizing such optical characteristics, has still been in a field yet to be explored.

The substrate of a LT single crystal having a congruent composition which has been commercially available, is one wherein the Ta component is substantially excessive from the restriction of the technology for growing a single crystal. As the Li/Ta molar ratio is 0.94, a large amount of non-stoichiometric defects are contained as much as a few percent. On the other hand, the present inventors have found for the first time that it is possible to grow a LT single crystal having a Li/Ta molar ratio of from 0.95 to 1.02 closer to the stoichiometric composition by growing a crystal from a melt containing the Li component excessively, by a double crucible method wherein the material is continuously supplied, and the single crystal having the concentration of non-stoichiometric defects due to an excessive Ta component reduced, shows excellent characteristics as a substrate for an optically functional device.

Namely, it has been found that the large amount of non-stoichiometric defects formed by excessive Ta in a conventional crystal will create a serious problem to an optically functional device utilizing the polarization-inverted structures. By the presence of such defects, the hysteresis curve showing the relation between the spontaneous polarization and the applied voltage required for the polarization inversion, becomes asymmetric, and a high voltage of a few tens kV/mm will be required for the polarization inversion, and yet it has been found that if polarization inversion is carried out, large optical distortions and propagation losses will be introduced to the polarization-inverted boundaries. Further, it has been found that there are many non-stoichiometric defects, and such defects are non-uniformly distributed within the crystal, and at a portion where the defect concentration is high, polarization inversion is likely to be pinning, whereby a larger distortion tends to be built up, thus leading to breakage of the crystal.

Now, a process for production and physical properties of the LT single crystal to be used for the optically functional device of the present invention, will be described. Starting material powders of commercially available high purity $Li_2CO_3$ and $Ta_2O_5$ were prepared. To obtain a material for the Li component excessive composition, they were mixed in a ratio of $Li_2CO_3:Ta_2O_5$ being from 0.56:0.44 to 0.66:0.34, and to obtain a material for the stoichiometric composition, they were mixed in a ratio of $Li_2CO_3:Ta_2O_5$ being 0.50:0.50. Then, the respective materials were subjected to rubber press molding under a hydrostatic pressure of 1 ton/cm², followed by sintering at a temperature of about 1,050° C. in atmospheric air to obtain starting material rods. Further, as a powder material for continuous supply, the material for the stoichiometric composition which was already mixed, was sintered at a temperature of about 1,350° C. in atmospheric air to obtain also a material having the stoichiometric composition.

Then, employing a double crucible method for continuous supply of the material, growing of a Li excessive LT single crystal close to the stoichiometric composition, was carried out. A seed crystal was dipped in a melt of the Li component excessive composition in a double crucible and pulled up at a rate of 0.5 mm/hr at a crystal rotational speed of 20 rpm to obtain a single crystal close to the stoichiometric composition i.e. having the non-stoichiometric defect concentration suppressed as far as possible. To precisely control the density and structure of the non-stoichiometric defect, the crystal was grown while automatically supplying to the outer crucible the material having the stoichiometric composition having a molar fraction of $Li_2O/(Ta_2O_5+Li_2O)$ of 0.50 in an amount corresponding to the crystallized growth amount.

Here, the crucibles used for growing were made of iridium, and the outer crucible had a diameter of 125 mm and a height of 70 mm, and the inner crucible had a diameter of 85 mm and a height of 90 mm. Also in this case, in order to homogenize the composition of the melt, the crucible was rotated at a rate of 4 rpm in a direction opposite to the seed crystal during the growing. As the growing conditions, the rotational speed of the crystal was 20 rpm, and the pulling up speed was constant at 0.5 mm/hr, and the atmosphere for the growing was nitrogen containing 0.05% of oxygen.

During the growing process, as in the case of growing a usual optical congruent LT single crystal, attention has been paid so that transition metal impurities such as iron and chromium which are considered to be a factor to induce optical damages, will not enter as far as possible. By the growing for about one week, a colorless transparent LT crystal having no cracks was obtained of a size with a diameter of about 55 mm and a length of about 70 mm. The domain state in the interior of the obtained as-grown crystal was a multi-domain state.

Therefore, before poling, the Curie temperature of the obtained LT single crystal was determined by a differential thermal analysis. Preliminarily, a mixture formulated to have the stoichiometric composition, was sintered at 1,500° C. to obtain a standard sintered sample having the stoichiometric composition, and the Curie temperature of the standard sample was confirmed to be 690° C. The Curie temperatures of the respective LT single crystals obtained from melts having Li component excessive compositions (for example, molar fractions of $Li_2O/(Ta_2O_5+Li_2O)$ being from 0.59 to 0.61) in double crucibles, were measured. The Curie temperatures of the respective crystals were found to be within a range of from 689 to 691° C. and close to the Curie temperature of the standard sintered sample having the stoichiometric composition.

Further, with respect to each of the obtained crystals, samples were cut out from three portions, i.e. the upper portion, the center portion and the lower portion, of each crystal, and the respective Li/Ta molar ratios were obtained by a chemical analysis. In the chemical analysis, the composition was very carefully analyzed in order to accurately obtain the absolute values of the compositional ratios. The analysis was carried out by using different analytical instruments for the same sample, and the average value of the results was taken. As a result, the range of the composition of the LT single crystals grown from the above-mentioned melts was such that the Li/Ta molar ratio was from 0.95 to 1.02.

On the other hand, for a crystal having Mg added, the starting materials were prepared as follows. The starting material powders of commercially available high purity $Li_2CO_3$, $Ta_2O_5$ and MgO (or $Mg_2CO_3$) were prepared. To obtain the material for a melt, a mixture was prepared in a ratio of $Li_2CO_3:Ta_2O_5$ of from 0.56:0.44 to 0.66:0.34, and the MgO starting material powder was added thereto so that the mol % of [MgO] represented by $[MgO]/([LiNbO_3]+[MgO])$ would be from 0.1 to 5.0, followed by mixing. To obtain the material having the stoichiometric composition, the starting materials were mixed in a ratio of $Li_2CO_3:Ta_2O_5$ of 0.50:0.50. Then, in the same manner as the case for no addition, press molding, sintering and growing of a single crystal were carried out.

In the crystal having Mg added, Mg is substituted at Li and Ta sites, and as the amount of Mg increases, the Li/Ta molar ratio changes, and the Li/Ta molar ratio of the obtained crystals was within a range of more than 0.95 and less than 1.0. In a case where at least one element selected from Zn, Sc and In is added other than Mg, the content in the crystal relative to the added amount varies, as the segregation coefficient within the crystal varies depending upon the type of the element, but in the case of any added element, the added element will be substituted at Li and Ta sites, and as the amount of the added element increases, the Li/Ta molar ratio changes, and the Li/Ta molar ratio of the obtained crystals was within a range of more than 0.95 and less than 1.0.

Then, each of the crystals thereby obtained was heated to about 750° C. i.e. at least the Curie temperature, and then cooled to room temperature while applying a voltage of from about 5 to 10 V/cm from the Z-axis direction of the crystal, to form a single domain. From the single domained LT single crystal, a block sample having a size of 35 mm×35 mm×50 mm was cut out and subjected to surface polishing by mechanochemical polishing. The optical homogeneity of the sample was evaluated by Mach-zehnder interference method, whereby macro defects or optically non-uniform portions were not observed, and the change in the refractive index within the sample was not higher than $1 \times 10^{-5}$. Thus, it was confirmed that the sample was excellent in the optical homogeneity.

Figure 1B:
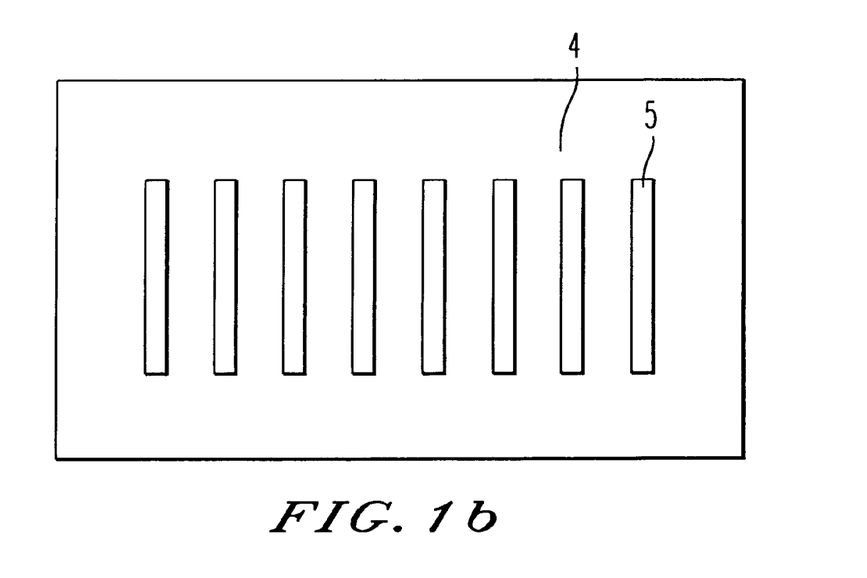
FIG. 1(b) is a view showing the +z surface of a LT crystal substrate close to the stoichiometric composition after forming periodic polarization inversion, as observed by a transmission polarization microscope.

FIG. 1 shows examples in which a LT single crystal was used as a substrate, periodic polarization-inverted structures were formed by an electric field application method on a substrate having a thickness of 0.5 mm and having both sides optically polished, and then, the polarization-inverted portions were inspected in detail by a polarization microscope. The periodic cycle of the polarization inversion was about 3 to 4 μm and was designed for quasi-phase matching depending upon the wavelength of the fundamental light in the vicinity of a wavelength of 850 nm.

FIG. 1(a) is a view when a conventional congruent composition was used for the substrate 1. FIG. 1(b) is a view when a LT single crystal having a composition close to the above-mentioned stoichiometric composition, was used for the substrate 4. The difference between the two is apparent. Namely, in FIG. 1(a), it was observed that very large optical distortions 3 were present in the periodic polarization-inverted portions 2, whereas in FIG. 1(b), under a polarization microscope, light passed uniformly, and no distortion was observed at the periodic polarization-inverted portions 5.

Further, polarization inversions having various shapes and sizes were formed in the crystal substrates, and the distortions at the polarization-inverted boundaries depending on the differences of the substrates, were observed, and the refractive indices at the polarization-inverted boundaries were evaluated by a laser interference method, whereby with the conventional crystal, a very large change in the refractive index from $8 \times 10^{-3}$ to $3 \times 10^{-4}$, was observed. Whereas, it was confirmed that with the optically functional device employing the crystal substrate of the present invention, it was possible to obtain an optical distortion of not higher than $1 \times 10^{-4}$ even when no thermal treatment was carried out.

Figure 2:
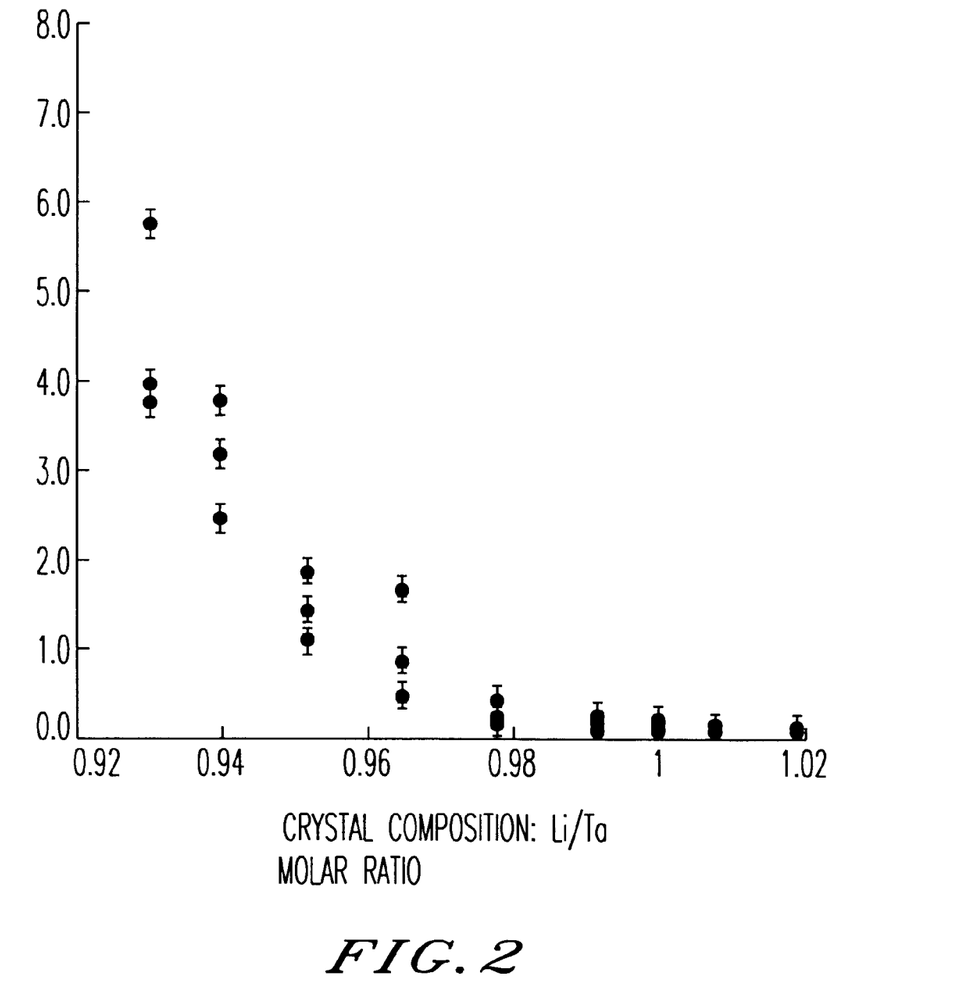
FIG. 2 is a graph showing the relation between the crystal composition and the propagation loss within the crystal as light propagates through polarization-inverted portions.

Further, FIG. 2 is a graph showing the results of evaluation of the degrees of the propagation losses caused by distortions or scattering in the crystal, of light propagating through the polarization-inverted portions, with respect to LT single crystals having various compositions and having a length of 5 mm and a thickness of 0.5 mm, with both side surfaces mirror polished, having periodic polarization-inverted structures formed by an electron beam irradiation method and an electric field application method at a temperature around room temperature.

Thus, as compared with LT having a congruent composition, LT having the stoichiometric composition has only a small difference in the molar fraction, but as it becomes close to the stoichiometric composition, the crystal characteristics will be substantially different. Especially, it shows optical characteristics substantially different from a conventional crystal having a congruent composition, within a range of the molar ratio of Li/Ta of the crystals being from 0.95 to 1.02.

Even among samples having the same composition, variation was observed in the propagation loss depending upon the applied voltage for the preparation of the polarization inversion, the shape of the electrode, the material of the electrode, the temperature, etc. It was found that a crystal having a congruent composition having a Li/Ta molar ratio of 0.94, the propagation loss was very large at a level of from 3.5 to 6%. Whereas, with the LT single crystal with no additive close to the stoichiometric composition, when the Li/Ta molar ratio is 0.95, the propagation loss was from 1 to 2%, and when the Li/Ta molar ratio was 0.98, the propagation loss was not more than 0.5%. Further, with many crystals such as a LT single crystal containing about 3 mol % of MgO and having a Li/Ta molar ratio of 0.95, the propagation loss was not more than 2%, and among them, there was a polarization-inverted crystal of good quality having a propagation loss of not more than 0.1%.

Figure 3:
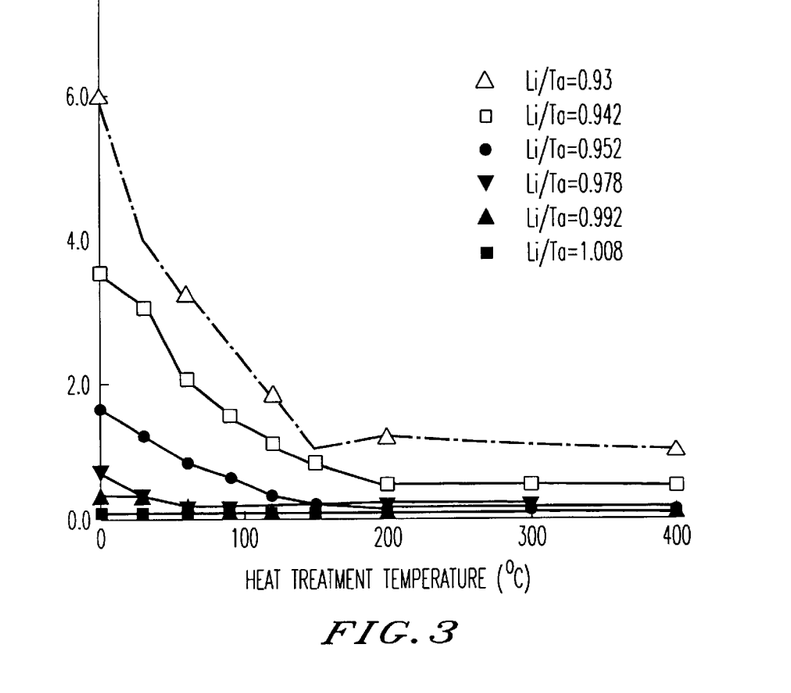
FIG. 3 is a graph showing the relation between the heat treatment temperature and the propagation loss within the crystal as light is passed through polarization-inverted portions.

Further, FIG. 3 is a graph showing how much the propagation loss of light passed through the polarization-inverted portions of a crystal having a length of 5 mm and a thickness of 0.5 mm and having periodic polarization-inverted structures formed by an electron beam irradiation method and an electric field application method at a temperature around room temperature, can be reduced by heat treatment. If a conventional crystal having a congruent composition is used, after the polarization inversion treatment, the loss tends to be very large due to e.g. an optical distortion or scattering. And, it has been found that with a congruent LT crystal, the loss can not be reduced unless the substrate is heated at a high temperature of at least 100° C. Whereas, in the case of an optically functional device employing as the substrate a LT single crystal close to the stoichiometric composition of the present invention, the loss is small even without carrying out heat treatment, and it is evident that improvement of the performance of the optically functional device can be expected.

In a LT single crystal, in a paraelectric phase at a temperature higher than the Curie temperature, Li and Ta ions are positioned at electrically neutral positions, but in a ferroelectric phase at a temperature of not higher than the Curie temperature, Li and Ta ions, or Li or Ta ions will be slightly displaced towards the +z or −z direction. Depending upon the direction of this displacement of ions, the positive or negative polarization direction of the domain will be determined. With an optically functional device having polarization-inverted structures, it becomes necessary to forcibly move such ions at a low temperature by applying a high electric field.

In the case of a congruent composition having many non-stoichiometric defects, it is not easy to move excess Ta entered into Li sites, whereby a high applied voltage will be required for the polarization inversion. Further, since the polarization is forcibly inverted by application of a high electric field, it is considered that a large optical distortions will be introduced to the polarization-inverted boundary. At present, the reasons for the reduction of the optical distortions or propagation losses as observed with the optically functional device of the present invention, can not fully be explained only with the degrees of the internal electric field and the voltage for inversion of the crystal.

However, it is evident that the LT single crystal close to the stoichiometric composition, which has small optical distortions or losses and having non-stoichiometric defects reduced by at least one digit over the conventional crystal having a congruent composition containing a large amount of non-stoichiometric defects, is superior as a substrate for a polarization-inverted device. Accordingly, by employing the LT single crystal having a composition close to the stoichiometric composition as a ferroelectric single crystal substrate, it is possible to obtain a change in the refractive index at the polarization-inverted boundaries of not higher than $1 \times 10^{-4}$ without a heating step to remove optical distortions at the polarization-inverted boundaries and without optical distortions at the polarization-inverted boundaries even when polarization inversion is formed, whereby the obtained device will have excellent characteristics as an optically functional device which is excellent in the controllability of the polarization-inverted structures and which is free from scattering of a laser beam and has a small propagation loss.

Now, the present invention will be described in further detail with reference to Examples. However, it should be understood that the present invention is by no means restricted to such specific Examples.

EXAMPLE 1

Figure 4:
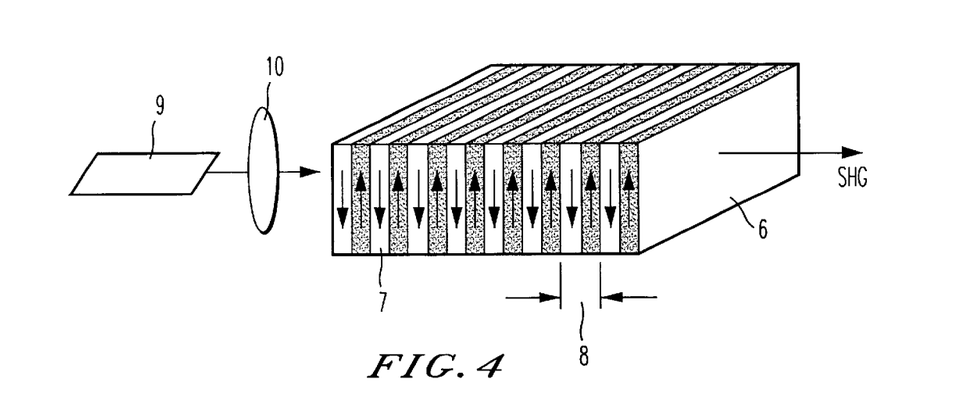
FIG. 4 is a schematic view illustrating a light frequency conversion device as one embodiment of the present invention.

The characteristics when a LT single crystal was applied to a light frequency conversion device, will be described. FIG. 4 is a schematic view illustrating a QPM device having periodically polarization-inverted structures formed on a substrate 6 to have the polarization-inverted regions 7 with a periodical polarization-inversion width 8 by using as the substrate 6 a single crystal close to the stoichiometric composition (a LT single crystal with no additive, having a Li/Ta molar ratio of from 0.98 to 1.02). On the +z surface of the substrate 6 having a thickness of 0.30 mm to 5.0 mm and having both sides optically polished, a comb electrode and a parallel electrode were formed by patterning. It was so designed that the periodic cycle was from about 3 to 4 μm, and quasi-phase-matching was established to the fundamental wave in the vicinity of a wavelength of about 850 nm. On the −z surface of the crystal substrate having the above composition, an electrode was vapor-deposited over the entire area. Across the comb electrode and the parallel electrode and across the comb electrode and the rear side electrode on the −z surface, a low electric field of from about 1.5 to 3 kV/mm, which is lower by at most ½ than for the conventional congruent crystal, was applied to form periodically polarization-inverted regions 7 without dielectric break down.

In this Example, the polarization-inverted portions of the periodically polarization-inverted structures were observed in detail by a polarization microscope, whereby no optical distortions were observed. Further, to the polarization-inverted portions, a laser beam from a wavelength-changeable laser 9 was passed through a lens 10, whereby no scattering of the laser beam was observed. Accordingly, no heat treatment was required, and yet frequency conversion with high efficiency was obtained. With the LT crystal employed, the polarization state was preliminarily very well homogenized. The LT single crystal close to the stoichiometric composition is excellent in the uniformity of the crystal, and when the periodic polarization inversion is to be formed in the crystal, it becomes possible to form uniform polarization-inverted structures.

Thus, the problems as observed when the conventional LT crystal having a congruent composition was used as a substrate, were solved. Further, after forming the polarization-inverted structures, the crystal was taken out, and the y surface of the crystal as the cross sectional surface was polished and subjected to etching with a mixed liquid of hydrofluoric acid and nitric acid, whereupon the state of inversion of polarization was examined. It was confirmed that with respect to the periodic polarization inversion width ratio and the polarization shape, by optimizing the pulse width of the applied voltage and the current, it was possible to bring the polarization inversion width ratio of the periodic polarization to an ideal ratio over the entire sample with high precision.

Likewise, also with respect to a sample having a thickness of 1 mm or more, it was possible to form the periodic polarization-inverted structures with high precision. Yet, no optical distortions were observed, and the propagation loss was very small at a level of not more than 0.2%. With such a thick sample, it was a substantial merit that no heat treatment was required after the polarization inversion. Namely, a sample having a thickness of 1 mm or more has had a problem that if there is a partial macro defect of the crystal, non-uniformity of the electrode or thermal non-uniformity, the polarization-inverted boundaries are likely to move during the heat treatment to remove optical distortions, or the crystal is likely to be broken by a pyroelectric effect.

Accordingly, it is considered that the optically functional device prepared in this Example, which is excellent in the optical uniformity and the polarization inversion controllability, is most suitable as a frequency conversion device of an internal resonator type which is required to have a particularly small propagation loss.

Figure 5:
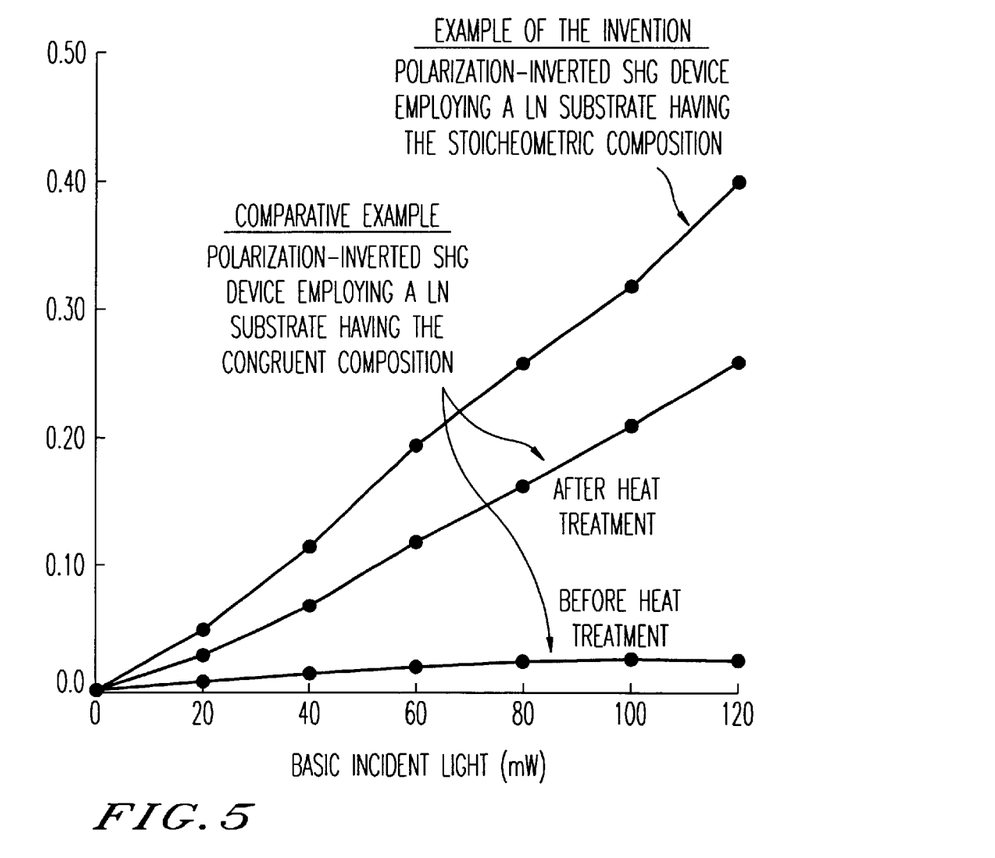
FIG. 5 is a graph showing the relation between the basic incident light and the SHG light output.

Evaluation of the characteristics of a QPM-SHG device was carried out by using a wavelength-changeable high power Ti sapphire laser (wavelength: 850 nm) as the fundamental wave, and light frequency conversion with high efficiency was confirmed. The results are shown in FIG. 5. When the conventional LT crystal having a congruent composition was used as the substrate, no substantial efficient frequency conversion was obtained before the heat treatment. Some improvement in the conversion efficiency was observed by the heat treatment, but with the optically functional device of the present invention, higher conversion efficiency was obtained.

The small propagation loss is believed to be the reason for the high conversion efficiency. Further, the non-linear optical constant of the substrate being large, no optical distortion being present, and the completeness of polarization-inverted structures being high without necessity of heat treatment, are considered to be contributing to the high performance of the optically functional device.

Here, an Example has been described wherein a QPM-SHG device for generating blue color light against the fundamental wave of a near infrared light in the vicinity of 850 nm, was prepared. However, according to the present invention, the fundamental wave is not limited to such two wavelengths, and the present invention is applicable to a wavelength range wherein the LT single crystal is transparent and phase-matching is possible.

Further, the optically functional device of the present invention wherein the polarization structure of a LT single crystal is periodically inverted and the wavelength of an incident laser having a visual to near infrared wavelength is shifted to a shorter or longer wavelength, is applicable not only to the second harmonic wave generating device, but also to an optical parametric oscillator device, a different frequency or sum frequency generating device, or a high performance optical device utilizing the polarization-inverted structures, such as an optical switch or an optical modulator. It is applicable also to an application field such as remote sensing or gas detection, or to an optical communication field including a wavelength mixer or a pulse forming device.

Here, as an Example of forming the polarization-inverted structures at portions of a ferroelectric single crystal substrate at a temperature of not higher than the Curie temperature, an optically functional device of a LT single crystal employing a voltage application method has been described. However, the same effects can be obtained if an electron beam scanning irradiation method is used as the method of forming the polarization-inverted structures at a temperature of not higher than the Curie temperature.

EXAMPLE 2

Figure 6:
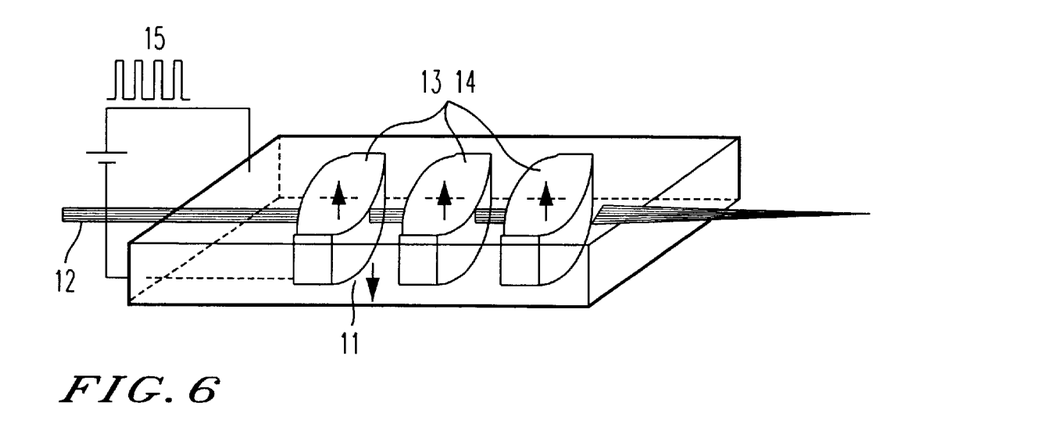
FIG. 6 is a schematic view illustrating a condensing device as another embodiment of the present invention.
Figure 7:
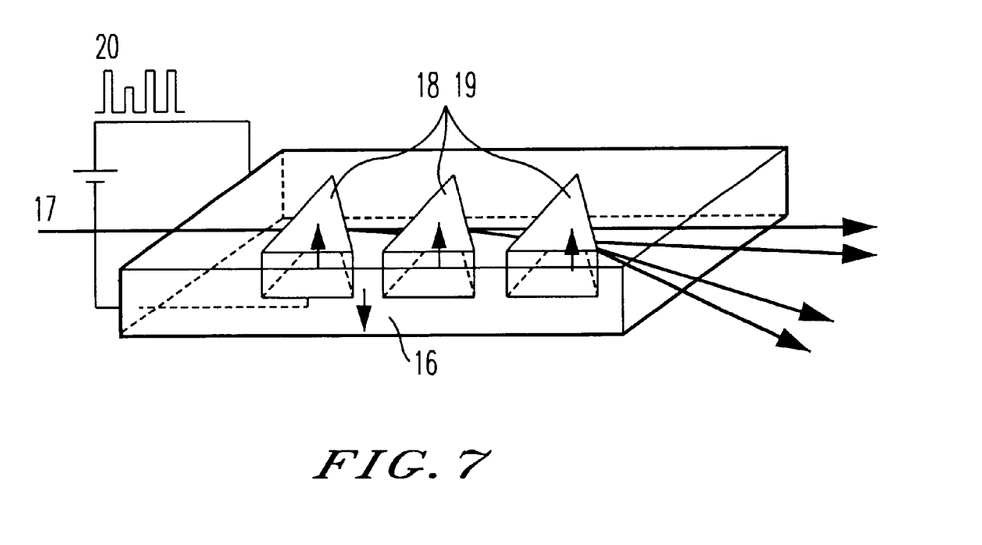
FIG. 7 is a schematic view illustrating a polarizing device as still another embodiment of the present invention.

Using a substrate close to the stoichiometric composition (a LT single crystal having a Li/Ta molar ratio of from 0.98 to 1.02 and containing no additive), polarization-inverted structures of a lens or prism shape were formed, and a polarizing device utilizing the electro-optical effect, or an optical device such as a cylindrical lens, a beam scanner or a switch, was prepared. FIGS. 6 and 7 are schematic views of optically functional devices for carrying out focusing and scanning to control laser beams from semiconductor lasers 12 and 17 introduced into single crystals, by utilizing the electro-optical effects formed by polarization-inverted portions 13 and 18 of lens 14 and prism 9 shapes, respectively. The above-mentioned LT single crystal with z-cut having both sides polished, was prepared, and an Al electrode having a thickness of about 0.2 μm was formed on both z-surfaces by spattering, and lens or prism patterns were formed by means of a lithograph. Then, on the +z-surface, a pulsed voltage 15 or 20 of from about 1.5 to 3 kV/mm was applied to invert the polarization.

In this Example, the polarization-inverted portions were observed in detail by a polarization microscope, whereby no optical distortions were observed. Further, a laser beam was passed through the polarization-inverted portions, whereby no scattering of the laser beam was observed. Accordingly, no heat treatment was required, and yet optically functional devices were obtained. The polarization state of the LT crystal employed was preliminarily very homogenized. Further, the end surfaces of the crystal were mirror-polished and used as input and output surfaces for the laser beam.

The performance of the optical device utilizing the electro-optical effect of the LT single crystal having inversion of the refractive index formed by the polarization-inverted structures, was determined by the design of the polarization-inverted structures of a lens or prism shape, the precision of the process for preparing the polarization-inverted structures and the degree of the electro-optical constant of the material. With respect to the polarization-inverted structures of a lens or prism pattern in this Example, it is noteworthy that there were no propagation losses or optical distortions at the polarization-inverted boundaries, and it was very easy to control the polarization inversion, whereby good device characteristics were obtained.

With a conventional LT crystal having a congruent composition, if the inversion periodical cycle becomes short or the inverted structures become complex, it is difficult to prepare polarization-inverted structures of a lens or prism shape with high precision, and heat treatment used to be required. Whereas, according to the present invention, a LT single crystal close to the stoichiometric composition is employed for application to an optically functional device utilizing the polarization-inverted structures, whereby it is possible to form polarization inversion with high precision for the optically functional device.

Further, this crystal has a larger electro-optical constant $r_{33}$ than the crystal having a congruent composition, whereby a better device performance was obtained with a smaller operation voltage. For example, in the case of a polarizing device, an angle of polarization as large as about 6° was obtained with a voltage of about 600 V/mm. Further, a lens operable in the vicinity of 100 V/mm was obtained, and switching operation at about 500 V/mm was accomplished.

Here, as an Example wherein polarization-inverted structures are formed at portions of a ferroelectric single crystal substrate at a temperature of not higher than the Curie temperature, an optically functional device of a LT single crystal employing a voltage application method, has been described. However, the same effects can be obtained, when an electron beam scanning irradiation method is used as the method of forming the polarization-inverted structures at a temperature of not higher than the Curie temperature.

As described in detail in the foregoing, the present invention provides an optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a LN single crystal of a composition close to the stoichiometric composition having a molar ratio of Li/Ta within a range of from 0.95 to 1.02, is used as the ferroelectric single crystal, whereby a propagation loss of not higher than 2% can be obtained, and a change in the refractive index of the polarization-inverted boundaries of not more than $1\times10^{-4}$ can be obtained without a heating step to remove optical distortions at the polarization-inverted boundaries due to the directional inversion of spontaneous polarization. Accordingly, a device free from distortions at the domain boundaries and excellent in the optical homogeneity and the polarization inversion controllability, can be realized, and substantial improvement of the characteristics of optically functional devices can be expected.

Thus, the present invention will bring about significant effects to accelerate practical application of optically functional devices in various fields of e.g. optical information processing, optical processing technology, optical communication technology and optical measurement using a laser beam.

The entire disclosure of Japanese Patent Application No. 2000-281878 filed on Sep. 18, 2000 including specification, claims, drawings and summary are incorporated herein by reference in its entirety.

What is claimed is:

1. An optically functional device, comprising:
a ferroelectric single crystal substrate having polarization-inverted structures formed in portions therein at a temperature of not higher than the Curie temperature by electron beam scanning irradiation or by the application of voltage, said substrate formed from a LiTaO$_3$ crystal having a molar ratio of Li/Ta within a range of 0.95 to 1.00 and containing from 0.1 to 4.8 mol % of at least one element selected from the group consisting of Mg, Zn, Sc and In, as doped, and designed to control light which passes through the polarization-inverted portions, so that the propagation loss of light that passes through the polarization-inverted portions immediately after formation of the polarization-inverted structures, is not more than 25%.

2. An optically functional device, comprising:
a ferroelectric single crystal substrate having polarization-inverted structures formed in portions therein at a temperature of not higher than the Curie temperature by electron beam scanning irradiation or by the application of voltage, said substrate formed from a LiTaO$_3$ crystal having a molar ratio of Li/Ta within a range of 0.95 to 1.00 and containing from 0.1 to 4.8 mol % of at least one element selected from the group consisting of Mg, Zn, Sc and In, as doped, and designed to control light which passes through the polarization-inverted portions, so that the change in the refractive index of the polarization-inverted boundaries is not more than $1\times10^{-4}$ without having to apply a heating step to remove optical distortion at the polarization-inverted boundaries due to the directional inversion of spontaneous polarization in the ferroelectric crystal.

3. The optically functional device according to claim 1, wherein said Li/Ta molar ratio ranges from 0.98 to 1.00.

4. The optically functional device according to claim 2, wherein said Li/Ta molar ratio ranges from 0.98 to 1.00.

5. A single crystal substrate for an optically functional device to control light that passes through polarization-inverted portions, which is a ferroelectric single crystal substrate having polarization-inverted structures formed at a temperature of not higher than the Curie temperature by electron beam scanning irradiation or by the application of voltage, wherein a LiTaO$_3$ crystal having a molar ratio of Li/Ta within a range of 0.95 to 1.00 and containing from 0.1 to 4.8 mol % of at least one element selected from the group consisting of Mg, Zn, Sc and In, as doped, so that a propagation loss of light of not more than 2% and an optical distortion of not more than $1\times10^{-4}$ are obtainable without the application of a heat treatment.

6. A method for improving the frequency conversion efficiency of an optically functional device, comprising:
providing the device with a LiTaO$_3$ crystal substrate having a molar ratio of Li/Ta within a range of 0.95 to 1.00, and containing from 0.1 to 4.8 mol % of at least one element selected from the group consisting of Mg, Zn, Sc and In, as doped, which enables the optically functional device to carry out the frequency conversion of laser light that enters a single crystal of the substrate having periodically inverted polarization structures by means of a nonlinear optical effect.

7. A method for improving the driving efficiency of an optically functional device, comprising:

providing the device with a $LiTaO_3$ single crystal substrate having a molar ratio of Li/Ta within a range of 0.95 to 1.02 and having inverted polarization structures of a prism or lens shape, thereby enabling the optically functional device to control polarization or condense a laser light beam entering said single crystal by means of an electro-optical effect.

* * * * *